United States Patent
Schmid

(10) Patent No.: US 6,513,387 B1
(45) Date of Patent: Feb. 4, 2003

(54) ACCELERATION COMPENSATED PRESSURE MEASURING INSTRUMENT

(75) Inventor: Felix Schmid, Belfaux (CH)

(73) Assignee: Vibro-Meter SA (CH)

( * ) Notice: Subject to any disclaimer, the term of this patent is extended or adjusted under 35 U.S.C. 154(b) by 0 days.

(21) Appl. No.: 09/411,963

(22) Filed: Oct. 4, 1999

(30) Foreign Application Priority Data

Oct. 6, 1998 (EP) .............................................. 98811005

(51) Int. Cl.⁷ ................................................. G01L 7/00
(52) U.S. Cl. ...................................................... 73/756
(58) Field of Search ........................ 73/782, 756, 724, 73/718; 361/283.1–283.4; 310/338

(56) References Cited

U.S. PATENT DOCUMENTS

| | | | |
|---|---|---|---|
| 2,989,085 A | | 6/1961 | Di Giovanni ................ 137/793 |
| 4,389,895 A | * | 6/1983 | Rud, Jr. ......................... 73/724 |
| 5,902,933 A | * | 5/1999 | Bingo et al. ................... 73/724 |
| 6,105,434 A | * | 8/2000 | Engeler ......................... 73/702 |
| 6,223,603 B1 | * | 5/2001 | McKinnon ..................... 73/718 |

FOREIGN PATENT DOCUMENTS

GB 899494 6/1962

* cited by examiner

Primary Examiner—William Oen
Assistant Examiner—Marissa Ferguson
(74) Attorney, Agent, or Firm—Ostrolenk, Faber, Gerb & Soffen, LLP

(57) ABSTRACT

Pressure measuring instrument, comprising a mounting plate and a flexible separating element which is disposed in an opening of the mounting plate and fastened thereto, and which separating element is under the action of a measured pressure during the pressure measurement. In order to compensate errors of the pressure measurement due to accelerations, the pressure measuring instrument further comprises a reference body which is connected to said mounting plate via a suspension and comprises a reference surface facing a surface of said separating element, the reference body and the suspension being so designed that when the entire pressure measuring instrument is subject to an acceleration, the resulting displacement of the reference surface of said reference body is equal to the displacement of the surface of said separating element on account of the acceleration.

8 Claims, 3 Drawing Sheets

ACCELERATION COMPENSATED PRESSURE MEASURING INSTRUMENT

FIELD OF THE INVENTION

The present invention refers to a pressure measuring instrument comprising a mounting plate and a flexible separating element which is disposed in an opening of the mounting plate and fastened thereto, the separating element being under the action of a measured pressure during the pressure measurement.

BACKGROUND OF THE INVENTION

In pressure measuring instruments of the above-mentioned kind, the pressure acting e.g. on a membrane is usually measured by measuring the corresponding force acting upon the membrane by means of a force-sensing element which delivers a signal whose amplitude corresponds to the measured pressure. Pressure measuring instruments of this kind exhibit an undesired sensitivity to accelerations since the membrane which is exposed to the pressure and the measuring element itself have a certain mass. Therefore, in the case of accelerations of the entire pressure measuring instrument in the axial direction, the force-sensing element is not only subject to the pressure force to be measured but also to a force of inertia which is superimposed on the pressure force. The measured pressure signal is therefore incorrect.

Pressure measuring instruments are known in which two measuring elements are used in order to compensate the influence of accelerations on the measuring result, the two measuring elements having the same sensitivity to acceleration, but only one of them being exposed to the pressure to be measured. In other words, a pressure measuring element and an acceleration measuring element are used. In such pressure measuring instruments, the error of the measuring result on account of the acceleration is corrected by forming the difference of the signals delivered by the measuring elements.

These known pressure measuring instruments have the disadvantage that two distinct measuring elements are required, thereby increasing the manufacturing costs. Moreover, the two distinct measuring elements mostly have different basic sensitivities and therefore have to be balanced.

Generally, the used measuring elements also have different temperature characteristics and frequency responses. The obtained compensation therefore usually depends on the frequency and the temperature.

SUMMARY OF THE INVENTION

Consequently, the aim of the invention is to provide a pressure measuring instrument of the above-mentioned kind comprising a single measuring element which is mounted in such a manner that the influence of accelerations is compensated while the acceleration compensation is largely independent from the temperature characteristics, the frequency response, and the aging of the measuring instrument.

According to the invention, this aim is attained by a pressure measuring instrument of the above-mentioned kind wherein the pressure measuring instrument further comprises a reference body which is connected to said mounting plate via a suspension and comprises a reference surface facing a surface of said separating element, the reference body and the suspension being so designed that when the entire pressure measuring instrument is under the action of an acceleration, the resulting displacement of the reference surface of said reference body is equal to the displacement of the surface of said separating element on account of the acceleration.

In particular, the advantages provided by a pressure measuring instrument according to the invention are that acceleration compensated measuring results, which are largely independent from the temperature characteristics, the frequency response, and the aging of the measuring element, are obtained substantially without increasing the manufacturing costs.

BRIEF DESCRIPTION OF THE DRAWINGS

Exemplary embodiments of the invention are described hereinafter with reference to the accompanying drawings.

DETAILED DESCRIPTION OF THE INVENTION

Example 1

Figure 1:
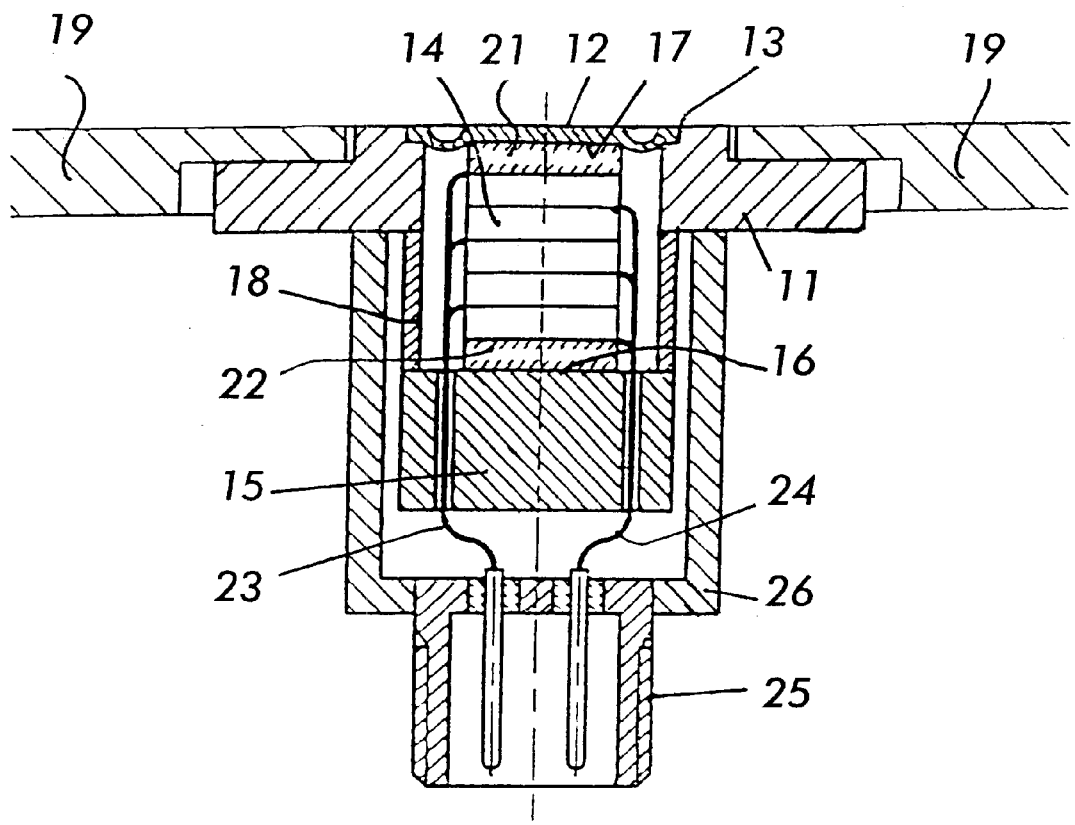
FIG. 1 shows a cross-section of a first embodiment of a pressure measuring instrument according to the invention along the axis of symmetry thereof.

FIG. 1 shows a first embodiment of a pressure measuring instrument according to the invention. The instrument comprises a mounting plate 11, a membrane 12, and a reference body 15. Mounting plate 11 is e.g. fastened in a cutout of a fixture 19 where a pressure is intended to be measured.

Membrane 12 is disposed in an opening 13 of mounting plate 11 and fastened therein by welding. In a pressure measurement, the pressure measuring instrument is used in such a manner that the measured pressure acts upon membrane 12.

Instead of membrane 12, another flexible separating element may be used, e.g. a bellows or a thin sleeve.

Reference body 15 is connected to mounting plate 11 by means of a suspension 18. Reference body 15 comprises a reference surface 16 facing a surface 17 of membrane 12. All these components are preferably welded to each other. However, they may also be cemented or connected to each other in another manner.

In the exemplary embodiment according to FIG. 1, the pressure measuring instrument according to the invention further comprises a force-sensing element 14 which is disposed between membrane surface 17 and reference surface 16 of reference body 15. Force-sensing element 14 is e.g. composed of five piezoelectric disks and insulated from membrane 12 and from reference body 15 by insulating disks 21, 22.

It is understood that instead of a piezoelectric force-sensing element, other technically equivalent force-sensing elements may be used such as piezopermittive transducers, magnetostrictive transducers, or piezoresistive transducers.

Electric connections 23 and 24 of force-sensing element 14 are guided through bores of reference body 15 and connected to a plug 25 which is supported by an enclosure 26.

Membrane 12, force-sensing element 14, insulating disks 21, 22, and reference body 15 are connected to each other with mechanical pretension. The pretension is generated by deflection of the membrane and extension of suspension 18.

Force-sensing element 14 contacts membrane 12 via insulating disk 21 and rests on a reference surface 16 of reference body 15 via insulating disk 22.

Membrane 12, reference body 15, and suspension 18 are so designed that when the entire pressure measuring instrument is subject to an acceleration, the resulting displacements of membrane surface 17 and of reference surface 16 of reference body 15 in the direction of the measuring axis of the force-sensing element are equal. According to the invention, this is preferably achieved in that the effective mass Mm and the tensile rigidity Cm of membrane 12, on one hand, and the effective mass Mr of the reference body 15 and the tensile rigidity Cr of suspension 18 on the other hand are so adjusted to each other that when the entire pressure measuring instrument is subject to an acceleration force, the resulting displacements of membrane surface 17 and of reference surface 16 of reference body 15 in the direction of the measuring axis of the force-sensing element are equal.

It is thereby ensured that there is no longitudinal deformation of the force-sensing element on account of accelerations, and accordingly, that no corresponding force variation is measured.

Mm and Cm, on one hand, and Mr and Cr on the other hand are e.g. defined as follows:

The membrane mass Mm which is relevant for the acceleration sensitivity of the measuring device is approximately equal to the mass of the moving portion of membrane 12 itself, the mass of insulating disk 21, and about half of the mass of force-sensing element 14. The tensile rigidity Cm of membrane 12 is the force which is required for a displacement of the membrane alone by one length unit in the measuring direction of force-sensing element 14.

The reference mass Mr effective in the compensation of the acceleration sensitivity of the measuring device is equal to the mass of the reference body, the mass of insulating disk 22, about half the mass of force-sensing element 14, as well as about half the mass of suspension 18. The tensile rigidity Cr of suspension 18 is the force which is required for a displacement of the reference body alone by one length unit in the measuring direction of the force-sensing element.

When the pressure measuring instrument is exposed to an acceleration a, membrane surface 17 of membrane 12 and reference surface 16 of reference body 15 are subject to simultaneous displacements Dm and Dr, respectively. Meanwhile, according to the invention, there should be no force variation, i.e. no longitudinal deformation of the force-sensing element.

The displacement Dm of membrane 12 caused by an acceleration a amounts to $$i \; Dm = a*Mm/Cm \quad (1)$$

The displacement Dr of reference surface 16 of reference body 15 caused by an acceleration a amounts to $$Dr = a*Mr/Cr \quad (2)$$

According to the invention, the tensile rigidity Cr and the reference mass Mr are so dimensioned that the ratios Mm/Cm and Mr/Cr are equal. Therefore, $$Mm/Cm = Mr/Cr \quad (3)$$

It follows from (1), (2), and (3) that in a pressure measuring instrument according to the invention, the displacement Dm of the membrane due to accelerations and the displacement Dr of reference surface 16 of reference body 15 due to accelerations are equal, i.e.

$$Dm = Dr \quad (4)$$

Accordingly, the relationship Mm/Cm=Mr/Cr according to the invention ensures that accelerations do not cause a longitudinal deformation (respectively force variation) of force-sensing element 14 disposed between membrane 12 and reference body 15, and errors of the measuring signal delivered by force-sensing element 14 due to accelerations are therefore excluded.

The preceding considerations are valid under the assumption that all involved components are homogenous, and also that the sensitivity of the force-sensing element is homogeneously distributed over its length. If these assumptions are not sufficiently accurate for a given embodiment, the structure may by analyzed more precisely e.g. by an analysis by means of finite elements. However, in this case as well, an effective tensile rigidity Cr and reference body mass Mr can be found in order to fulfill the condition that the displacements due to accelerations of the two end surfaces of the measuring element are equal and therefore no force variations due to accelerations are recorded.

Compared to an embodiment without acceleration compensation, the sensitivity of the pressure measuring instrument is somewhat reduced by the acceleration compensation according to the invention since the force-sensing element is not supported on a rigid base but by elastic suspension 18. The greater the extension of suspension 18, the stronger is the deformation of membrane 12. This means that the membrane itself absorbs a part of the pressure force, which leads to the mentioned reduction of the sensitivity. It is therefore preferred to make the tensile rigidity Cr of suspension 18 substantially greater than the tensile rigidity Cm of the membrane.

In a process for the manufacture of a pressure measuring instrument according to the invention, a calibration of the mass Mr, e.g. by turning reference body 15 to size, and/or of the tensile rigidity Cr by machining suspension 18 can be achieved in a simple manner in order to compensate possible tolerances with respect to the mass and the tensile rigidity of the involved components, if it seems necessary at all. However, since the reproducibility of an accurate acceleration compensation according to the invention depends on the mechanical tolerances of the involved components and on the specific masses exclusively, a calibration can generally be omitted, which is one of the advantages of the pressure measuring instrument according to the invention.

Furthermore, in a balanced pressure measuring instrument according to the invention, the first resonance frequency $\omega_m = \sqrt{Cm/Mm}$ of the membrane is equal to the first resonance frequency $\omega_r = \sqrt{Cr/Mr}$ of the reference body. Therefore, the acceleration compensation is effective in a wide range of frequencies almost up to the resonance frequency.

Another advantage of the acceleration compensation according to the invention is that once it is adjusted, the acceleration compensation of the pressure measuring instrument is conserved in all circumstances since it is only a function of the masses Mm and Mr and of the tensile rigidities Cm, Cr.

In a preferred embodiment, membrane 12 and suspension 18 are made of the same material. In this case, the two components have the same modulus of elasticity E. The resulting advantage is that the acceleration compensation is independent from the temperature.

The acceleration compensation is also independent from the specific sensitivity of force-sensing element 14 and therefore independent from the temperature characteristics or from eventual aging of the force-sensing element.

Example 2

Figure 2:
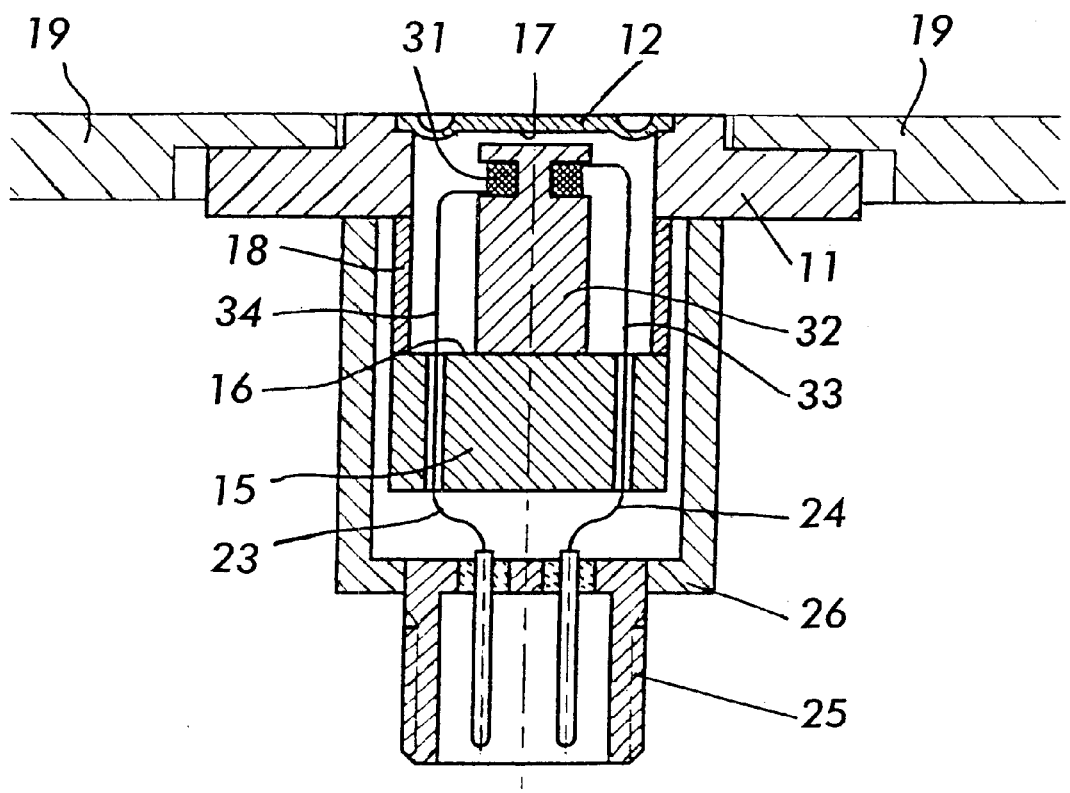
FIG. 2 shows a cross-section of a second embodiment of a pressure measuring instrument according to the invention along the axis of symmetry thereof.

FIG. 2 shows a second embodiment of a pressure measuring instrument according to the invention. This embodiment essentially comprises the same components as example 1 except force-sensing element 14, which is omitted. In this second embodiment, instead of the force measurement by means of a force-sensing element, a variation of the distance between membrane 12 and reference body 15 is measured in a contactless manner. To this end, known means allowing a distance measurement are used, e.g. an arrangement for a capacitive or an inductive distance measurement, or an arrangement for an optical distance measurement.

In the embodiment according to FIG. 2, the variation of the distance of membrane 12 with respect to reference body 15 is measured by a coil 31 which is wound up on a core 32 which in turn is cemented to reference body 15. A high frequency AC current is supplied through the two connecting wires 33 and 34. Membrane 12 is made of metal. Coil 31 induces eddy currents in membrane 12 which are a function of the distance between membrane 12 and coil 31. The resulting variation of the impedance of coil 31 can be used as a measure of the variation of the distance and thus of the measured pressure.

All considerations with respect to the acceleration compensation are valid for this second embodiment in exactly the same manner as for the first embodiment according to FIG. 1, with the obvious exception that in the second embodiment, the mass of coil 31 and of core 32 must be entirely added to the mass Mr of reference body 15, and that no part of the measuring element must be added to the mass Mm of the membrane.

Example 3

Figure 3:
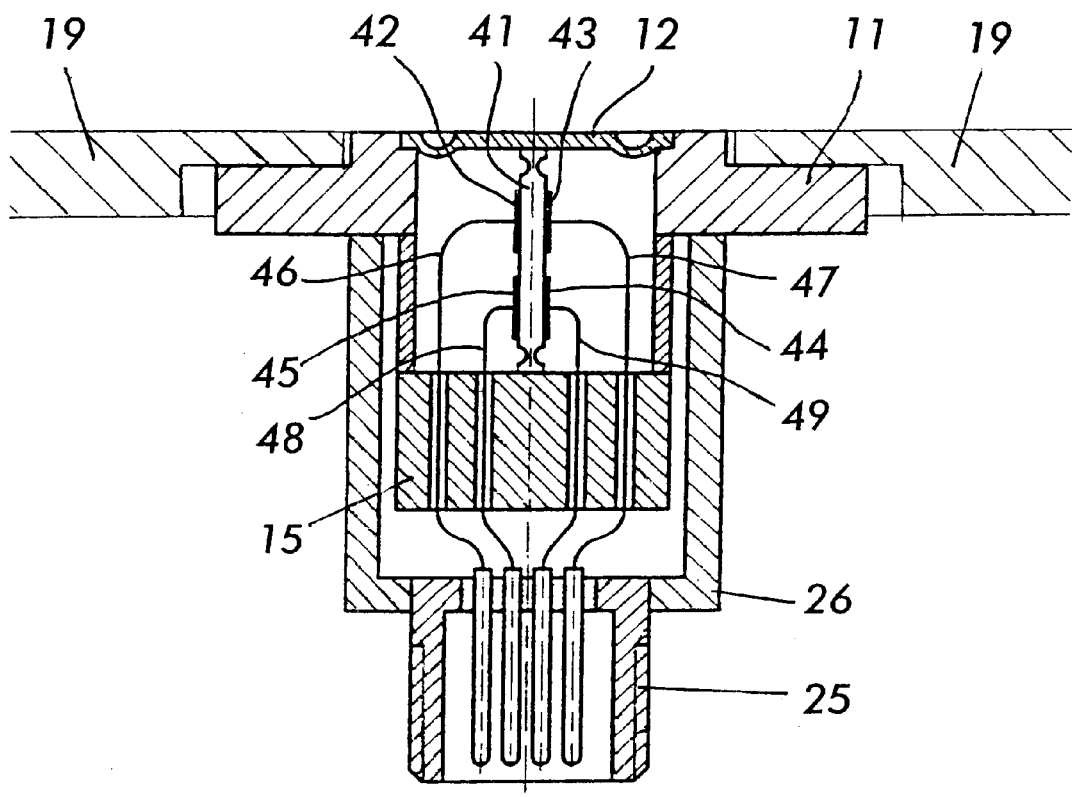
FIG. 3 shows a cross-section of a third embodiment of a pressure measuring instrument according to the invention along the axis of symmetry thereof.

FIG. 3 shows a third embodiment of a pressure measuring instrument according to the invention. This embodiment also comprises essentially the same components as example 1 except force-sensing element 14, which is omitted. In this third embodiment, instead of a force measurement by means of a force-sensing element, an oscillating element 41 is tensioned between membrane 12 and reference body 15, e.g. an oscillating bar or an oscillating string.

In the embodiment according to FIG. 3, the oscillating element 41, which in the present case consists of a piezoelectric material, is preferably mounted in the center of membrane 12 approximately and connected to reference body 15 in the vertical direction. A flexural oscillation of the oscillating body is provided in a known manner by two electrodes 42 and 43. The resonance frequency of this oscillation, which can be measured by the pair of electrodes 44, 45, is modified by the pressure force acting upon the oscillating element via membrane 12. This variation of the resonance frequency allows to obtain a useful signal which corresponds to the measured pressure.

Connecting wires 46–49 provide the necessary connections of electrodes 42–45.

All considerations with respect to the acceleration compensation are valid for this third embodiment in exactly the same manner as for the first embodiment according to FIG. 1, the force-sensing element being replaced by the oscillating element in the third embodiment.

Numerous modifications and alternative embodiments of the instrument according to the invention will be apparent to those skilled in the art in view of the foregoing description. Accordingly, this description is to be construed as illustrative only and is for the purpose of teaching those skilled in the art the best mode of carrying out the invention. Details of the instrument according to the invention may be varied substantially without departing from the spirit of the invention and the exclusive use of all modifications which come within the scope of the appended claims is reserved.

What is claimed is:

1. A pressure measuring instrument comprising:
   (a) a mounting plate having an opening;
   (b) a flexible separating element disposed in the opening of the mounting plate and fastened thereto, a pressure to be measured being exerted on the separating element in an axial direction during a pressure measurement carried out with the instrument;
   (c) a reference body connected to the mounting plate by a suspension, the reference body having a reference surface facing a surface of the separating element, and the separating element and the suspension are the same material; and
   (d) a sensor element disposed between the surface of the separating element and the reference surface of the reference body, wherein
      the mass and the tensile rigidity of the separating element, and the mass and the tensile rigidity of the reference body and the suspension are adjusted to each other such that when the pressure measuring instrument is subject to an acceleration in the axial direction, the resulting axial displacement of the reference surface of the reference body is substantially equal to the axial displacement of the surface of the separating element such that the acceleration does not cause an error in the pressure measured by the sensor element.

2. The pressure measuring instrument according to claim 1, wherein the resulting axial displacement of the surface of the separating element and the reference surface of the reference body are equal when the pressure measuring instrument is subject to the acceleration in the axial direction.

3. The pressure measuring instrument according to claim 1, wherein the mass and the tensile rigidity of the separating element, and the mass of the reference body and the tensile rigidity of the suspension are related by the relationship:

mass of the separating element/tensile rigidity of the separating element=mass of the reference body/tensile rigidity of the suspension wherein the mass of the separating element includes a part of the mass of any element connected to the separating element and the mass of the reference body includes a part of the mass of any element connected to the reference body, the tensile rigidity of the separating element is the force required for displacing the separating element by one length unit in the axial direction, and the tensile rigidity of the suspension is the force required for displacing the reference body by one length unit in the axial direction.

4. The pressure measuring instrument according to claim 1, wherein the sensor element comprises at least one force-sensing element disposed between the separating element and the reference body, the force-sensing element measuring a force acting upon the separating element, a part of the mass of the force-sensing element comprising the mass of the separating element, and another part of the mass of the force-sensing element comprising the mass of the reference body.

5. The pressure measuring instrument according to claim 1, wherein the sensor element comprises means for measuring a variation of the distance between the surface of the separating element and the reference surface of the reference body.

6. The pressure measuring instrument according to claim 1, wherein the sensor element comprises at least one oscillating element and means for measuring a variation of a resonance frequency of the at least one oscillating element.

7. The pressure measuring instrument according to claim 1, wherein the tensile rigidity of the suspension is greater than the tensile rigidity of the separating element.

8. A pressure measuring instrument according to claim 1, wherein the separating element is a membrane and the axial direction is defined by an axis which is normal to and passes through the center of a surface of the separating element.

* * * * *

UNITED STATES PATENT AND TRADEMARK OFFICE
CERTIFICATE OF CORRECTION

PATENT NO.   : 6,513,387 B1
DATED        : February 4, 2003
INVENTOR(S)  : Felix Schmid It is certified that error appears in the above-identified patent and that said Letters Patent is hereby corrected as shown below:

<u>Column 6,</u>
Line 23, after "material" insert -- whereby an acceleration compensation is substantially independent from temperature --.

Signed and Sealed this

Twenty-ninth Day of July, 2003

JAMES E. ROGAN
*Director of the United States Patent and Trademark Office*